United States Patent
Bugenhagen

(10) Patent No.: US 10,713,076 B2
(45) Date of Patent: *Jul. 14, 2020

(54) PHYSICAL TO VIRTUAL NETWORK TRANSPORT FUNCTION ABSTRACTION

(71) Applicant: CenturyLink Intellectual Property LLC, Denver, CO (US)

(72) Inventor: Michael K. Bugenhagen, Leawood, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/865,009

(22) Filed: Jan. 8, 2018

(65) Prior Publication Data

US 2018/0150314 A1    May 31, 2018

Related U.S. Application Data

(63) Continuation of application No. 14/531,000, filed on Nov. 3, 2014, now Pat. No. 9,864,623.

(Continued)

(51) Int. Cl.
*G06F 9/455*    (2018.01)
*G06F 9/50*    (2006.01)
(Continued)

(52) U.S. Cl.
CPC ............ *G06F 9/45558* (2013.01); *G06F 8/10* (2013.01); *G06F 8/20* (2013.01); *G06F 2009/45591* (2013.01); *G06F 2009/45595* (2013.01)

(58) Field of Classification Search
CPC ..... G06F 8/10; G06F 8/20; G06F 8/24; G06F 9/45558; G06F 9/5072; G06F 2009/45595;

(Continued)

(56) References Cited

U.S. PATENT DOCUMENTS 6,182,275 B1    1/2001 Beelitz et al.
6,427,150 B1    7/2002 Oashi
(Continued)

FOREIGN PATENT DOCUMENTS

EP    2017711    1/2008
EP    2972859    1/2016
(Continued)

OTHER PUBLICATIONS

Dasgupta et al., A conceptual model of self-monitoring multi-core systems, 4 pages (Year: 2010).*

(Continued)

*Primary Examiner* — Thuy Dao

(57) ABSTRACT

When the physical network is transitioned into a virtual network, functionality provided by physical ports are no longer available in the virtual machine ("VM") environments. Physical to virtual network transport function abstraction may be implemented to provide software applications running in the VM with state information or similar information necessary for the software applications to continue running, without the physical ports that would provide such information in a physical system. In some embodiments, a virtual machine manager might send first information to a virtual infrastructure manager, which might send second information to a virtualized application manager or orchestrator. The virtualized application manager or orchestrator might in turn send third information to a virtualized application running in a virtual machine or container. The first, second, and/or third information might include state information (e.g., state change information) that enable software applications running in the VM to continue running, without physical ports.

11 Claims, 7 Drawing Sheets

Related U.S. Application Data

(60) Provisional application No. 61/907,330, filed on Nov. 21, 2013.

(51) Int. Cl.
*H04L 29/06* (2006.01)
*H04L 29/08* (2006.01)
*G06F 9/48* (2006.01)
*G06F 8/10* (2018.01)
*G06F 8/20* (2018.01)

(58) Field of Classification Search
CPC ......... G06F 2009/45591; G06F 3/0611; G06F 3/067; G06F 21/53; G06F 2009/45579; G06F 9/45533; G06F 16/182; H04L 67/10; H04L 67/16; H04L 12/66; H04L 12/4633; H04L 12/4641; H04L 45/02; H04L 45/04; H04L 43/08; H04L 43/04; H04L 67/1097
See application file for complete search history.

(56) References Cited

U.S. PATENT DOCUMENTS

| | | | |
|---|---|---|---|
| 6,560,641 B1 | 5/2003 | Powderly et al. | |
| 6,577,327 B1 | 6/2003 | Rochford et al. | |
| 7,664,115 B1 | 2/2010 | Robotham | |
| 7,672,923 B1 | 3/2010 | Reed | |
| 7,693,079 B2 | 4/2010 | Cerami et al. | |
| 7,953,865 B1 | 5/2011 | Miller et al. | |
| 8,051,382 B1 | 11/2011 | Kingdom et al. | |
| 8,103,480 B2 | 1/2012 | Korn et al. | |
| 8,223,655 B2 | 7/2012 | Heinz | |
| 8,462,632 B1 | 6/2013 | Vincent | |
| 8,717,895 B2 | 5/2014 | Koponen et al. | |
| 8,750,288 B2 | 6/2014 | Nakil et al. | |
| 8,755,377 B2 | 6/2014 | Nakil et al. | |
| 8,881,142 B1 | 11/2014 | Reid | |
| 8,931,038 B2* | 1/2015 | Pulier ................ G06F 9/45558 726/1 |
| 8,953,441 B2 | 2/2015 | Nakil et al. | |
| 8,959,185 B2 | 2/2015 | Nakil et al. | |
| 8,990,806 B2* | 3/2015 | Morariu .............. G06F 9/44505 718/1 |
| 9,098,214 B1 | 8/2015 | Vincent et al. | |
| 9,141,416 B2 | 9/2015 | Bugenhagen | |
| 9,158,565 B2 | 10/2015 | Jakoljevic et al. | |
| 9,185,170 B1 | 11/2015 | Grammel | |
| 9,231,892 B2* | 1/2016 | Baphna ................ H04L 49/70 |
| 9,250,863 B1 | 2/2016 | Vincent et al. | |
| 9,356,883 B1 | 5/2016 | Borthakur | |
| 9,386,001 B1 | 7/2016 | Marquardt et al. | |
| 9,417,902 B1 | 8/2016 | Noonan | |
| 9,430,259 B2 | 8/2016 | Bugenhagen | |
| 9,495,188 B1 | 11/2016 | Ettema et al. | |
| 9,582,305 B2 | 2/2017 | Bugenhagen | |
| 9,658,868 B2 | 5/2017 | Hill | |
| 9,703,598 B2 | 7/2017 | Vincent et al. | |
| 9,864,623 B2 | 1/2018 | Bugenhagen | |
| 2002/0152305 A1 | 10/2002 | Jackson et al. | |
| 2003/0055919 A1 | 3/2003 | Fong | |
| 2004/0015966 A1 | 1/2004 | Macchiano et al. | |
| 2005/0144288 A1 | 6/2005 | Liao | |
| 2005/0228921 A1 | 10/2005 | Sethi et al. | |
| 2006/0233144 A1 | 10/2006 | Matsumoto | |
| 2006/0235973 A1 | 10/2006 | McBride et al. | |
| 2007/0061433 A1 | 3/2007 | Reynolds | |
| 2007/0094085 A1 | 4/2007 | Redmond et al. | |
| 2007/0165818 A1 | 7/2007 | Savoor et al. | |
| 2007/0230358 A1 | 10/2007 | Narayanan et al. | |
| 2008/0002676 A1 | 1/2008 | Wiley | |
| 2008/0049639 A1 | 2/2008 | Wiley et al. | |
| 2008/0049640 A1 | 2/2008 | Heinz et al. | |
| 2008/0049927 A1 | 2/2008 | Wiley | |
| 2008/0052387 A1 | 2/2008 | Heinz et al. | |
| 2008/0155537 A1 | 6/2008 | Dinda et al. | |
| 2008/0259794 A1 | 10/2008 | Zou et al. | |
| 2009/0092151 A1 | 4/2009 | Raguet et al. | |
| 2009/0187654 A1 | 7/2009 | Raja et al. | |
| 2009/0204965 A1 | 8/2009 | Tanaka et al. | |
| 2009/0217267 A1 | 8/2009 | Gebhart | |
| 2009/0292858 A1* | 11/2009 | Lambeth ........... H04L 29/12839 711/6 |
| 2010/0023623 A1 | 1/2010 | Saffre et al. | |
| 2010/0027552 A1 | 2/2010 | Hill | |
| 2010/0043068 A1 | 2/2010 | Varadhan et al. | |
| 2010/0100640 A1 | 4/2010 | Nakao | |
| 2010/0122334 A1 | 5/2010 | Stanzione et al. | |
| 2010/0146504 A1* | 6/2010 | Tang .................. G06F 9/45537 718/1 |
| 2010/0162238 A1 | 6/2010 | Warfield | |
| 2010/0192152 A1 | 7/2010 | Miyamoto et al. | |
| 2010/0217837 A1 | 8/2010 | Ansari | |
| 2010/0235580 A1 | 9/2010 | Bouvier | |
| 2010/0306763 A1 | 12/2010 | Lambert et al. | |
| 2011/0055406 A1* | 3/2011 | Piper .................... G06F 9/5077 709/227 |
| 2011/0134930 A1 | 6/2011 | McLaren | |
| 2011/0153909 A1* | 6/2011 | Dong .................. G06F 9/45558 711/6 |
| 2011/0209157 A1 | 8/2011 | Sumida et al. | |
| 2011/0222412 A1 | 9/2011 | Kompella | |
| 2011/0231551 A1 | 9/2011 | Hassan et al. | |
| 2011/0252418 A1 | 10/2011 | Havivi et al. | |
| 2011/0276951 A1 | 11/2011 | Jain | |
| 2011/0296234 A1 | 12/2011 | Oshins et al. | |
| 2011/0310899 A1 | 12/2011 | Alkhatib et al. | |
| 2011/0314469 A1 | 12/2011 | Qian et al. | |
| 2012/0042040 A1 | 2/2012 | Bailey et al. | |
| 2012/0072909 A1 | 3/2012 | Malik et al. | |
| 2012/0089845 A1 | 4/2012 | Raleigh | |
| 2012/0151087 A1 | 6/2012 | Azam | |
| 2012/0151277 A1 | 6/2012 | Jung et al. | |
| 2012/0167083 A1 | 6/2012 | Suit | |
| 2012/0174099 A1 | 7/2012 | Ashok et al. | |
| 2012/0304175 A1 | 11/2012 | Damola et al. | |
| 2012/0307684 A1 | 12/2012 | Biswas et al. | |
| 2012/0331461 A1 | 12/2012 | Fries et al. | |
| 2013/0003538 A1 | 1/2013 | Greenberg et al. | |
| 2013/0031543 A1 | 1/2013 | Angus | |
| 2013/0058215 A1 | 3/2013 | Koponen et al. | |
| 2013/0061297 A1 | 3/2013 | Larsen et al. | |
| 2013/0145367 A1* | 6/2013 | Moss .................... H04L 43/04 718/1 |
| 2013/0147906 A1 | 6/2013 | Weiser et al. | |
| 2013/0191850 A1 | 7/2013 | Fischer et al. | |
| 2013/0204971 A1 | 8/2013 | Brandywine et al. | |
| 2013/0212600 A1 | 8/2013 | Harsh et al. | |
| 2013/0227670 A1 | 8/2013 | Ahmad et al. | |
| 2013/0254424 A1 | 9/2013 | Guay et al. | |
| 2013/0262652 A1 | 10/2013 | Vuhk et al. | |
| 2013/0275968 A1 | 10/2013 | Petev et al. | |
| 2013/0332926 A1 | 12/2013 | Jakoljevic et al. | |
| 2014/0012966 A1* | 1/2014 | Baphna ................. H04L 49/70 709/221 |
| 2014/0016924 A1 | 1/2014 | Gonzalez De Dios | |
| 2014/0123140 A1 | 5/2014 | Motoki | |
| 2014/0164618 A1 | 6/2014 | Alicherry et al. | |
| 2014/0189050 A1 | 7/2014 | Rijsman et al. | |
| 2014/0201374 A1 | 7/2014 | Ashwood-Smith et al. | |
| 2014/0280499 A1 | 9/2014 | Basavaiah et al. | |
| 2014/0282528 A1 | 9/2014 | Bugenhagen | |
| 2014/0282529 A1 | 9/2014 | Bugenhagen | |
| 2014/0307744 A1 | 10/2014 | Dunbar et al. | |
| 2014/0313984 A1 | 10/2014 | Diamond | |
| 2014/0321260 A1 | 10/2014 | Mishra et al. | |
| 2014/0347979 A1 | 11/2014 | Tanaka | |
| 2014/0359556 A1 | 12/2014 | Jujare et al. | |
| 2014/0372788 A1 | 12/2014 | Vavrick et al. | |
| 2015/0049601 A1 | 2/2015 | Bugenhagen | |
| 2015/0067229 A1* | 3/2015 | Connor ............... G06F 13/4022 710/317 |
| 2015/0074793 A1 | 3/2015 | Dalvi et al. | |

(56) References Cited

U.S. PATENT DOCUMENTS

| | | | |
|---|---|---|---|
| 2015/0088825 A1 | 3/2015 | Bloom et al. | |
| 2015/0089331 A1 | 3/2015 | Skerry et al. | |
| 2015/0117454 A1 | 4/2015 | Koponen et al. | |
| 2015/0134606 A1* | 5/2015 | Magdon-Ismail | G06F 16/27 707/610 |
| 2015/0143368 A1* | 5/2015 | Bugenhagen | G06F 9/45558 718/1 |
| 2015/0150020 A1 | 5/2015 | Duttagupta et al. | |
| 2015/0207699 A1 | 7/2015 | Fargano et al. | |
| 2015/0244617 A1 | 8/2015 | Nakil et al. | |
| 2015/0288541 A1 | 10/2015 | Fargano et al. | |
| 2015/0288622 A1 | 10/2015 | Fargano et al. | |
| 2015/0288767 A1 | 10/2015 | Fargano et al. | |
| 2015/0324220 A1 | 11/2015 | Bugenhagen | |
| 2015/0339156 A1 | 11/2015 | Vincent et al. | |
| 2015/0365281 A1* | 12/2015 | Marino | G06Q 30/04 709/223 |
| 2016/0006696 A1 | 1/2016 | Donley et al. | |
| 2016/0048403 A1 | 2/2016 | Bugenhagen | |
| 2016/0050159 A1 | 2/2016 | Cook et al. | |
| 2016/0087859 A1* | 3/2016 | Kuan | H04L 43/0817 715/736 |
| 2016/0197779 A1 | 7/2016 | Soejima | |
| 2016/0301668 A1 | 10/2016 | Marquardt et al. | |
| 2016/0337206 A1 | 11/2016 | Bugenhagen et al. | |
| 2016/0337270 A1 | 11/2016 | Heinonen et al. | |
| 2017/0093750 A1 | 3/2017 | McBride et al. | |
| 2017/0097834 A1 | 4/2017 | Cropper et al. | |
| 2017/0123839 A1 | 5/2017 | Bugenhagen | |
| 2017/0177396 A1* | 6/2017 | Palermo | G06F 9/45558 |
| 2018/0123974 A1 | 5/2018 | McBride et al. | |
| 2018/0157515 A1* | 6/2018 | Malloy | G06F 9/45558 |
| 2018/0157523 A1 | 6/2018 | Bugenhagen | |
| 2018/0159771 A1* | 6/2018 | Malloy | H04L 45/7453 |

FOREIGN PATENT DOCUMENTS

| | | |
|---|---|---|
| KR | 10-2012-0060014 | 6/2012 |
| KR | 10-2013-0093717 | 8/2013 |
| KR | 10-1472013 | 12/2014 |
| KR | 10-1475925 | 12/2014 |
| KR | 20-140145645 | 12/2014 |
| WO | WO-2014-110453 | 7/2014 |
| WO | WO-2014-150715 | 9/2014 |
| WO | WO 2015-077460 | 5/2015 |
| WO | WO-2015-126430 | 8/2015 |
| WO | WO-2016-025497 | 2/2016 |
| WO | WO-2016-025501 | 2/2016 |
| WO | WO-2017-023396 | 2/2017 |
| WO | WO-2017-058350 | 4/2017 |
| WO | WO-2017-062344 | 4/2017 |
| WO | WO-2017-146768 | 8/2017 |

OTHER PUBLICATIONS

LightReading (Mar. 17, 2015). "RAD Launches vCPE Platform for Hosting VNFs." Web Site www.lightreading.com/nfv/nfv-elements/rad-launches-vcpe-platform-for-hosting-vnfs. Accessed Sep. 8, 2015, 1 page.
Gowan, Bo. (Jun. 22, 2015) "Ciena unveils a carrier-grade CPE for NFV." Web Site www.ciena.com/connect/blog/Ciena-unveils-a-carrier-grade-CPE-for-NFV.html. Accessed Sep. 8, 2015, 4 pages.
Bohoris, Christos; "Network Performance Management Using Mobile Software Agents"; Jun. 2003; Centre for Communications Systems Research School of Electronics and Physical Sciences; University of Surrey, UK; 188 pages.
EP Patent App. No. 14768226.4; Supplementary European Search Report dated Nov. 29, 2016; 10 pages.
ETSI Group Specification (Oct. 2013), "Network Functions Virtualisation (NFV); Use Cases"; 50 pages.
Extended European Search Report, dated Nov. 21, 2017, 6 pages.
Henrik Basilier et al. Ericsson Review. Virtualizing network services—the telecom cloud, Mar. 28, 2014, Retrieved from the Internet: <http://www.ericsson.com/res/thecompany/docs/publications/ericssor_review/2014/er-telecom-cloud.pdf> ISSN 0014-0171. pp. 1-9.
International Application No. PCT/US2014/024050; International Preliminary Report on Patentability dated Sep. 24, 2015; 6 pages.
International Application No. PCT/US2014/024050; Published Application dated Sep. 25, 2014; 55 pages.
International Application No. PCT/US2014/066628; International Preliminary Report on Patentability dated Jun. 2, 2016; 7 pages.
International Application No. PCT/US2014/066628; Notification Concerning Availability of the Publication of the International Application dated May 28, 2015; 1 page.
International Application No. PCT/US2015/044682; International Preliminary Report on Patentability dated Mar. 2, 2017; 10 pages.
International Application No. PCT/US2015/044682; International Search Report and Written Opinion dated Nov. 16, 2015; 13 pages.
International Application No. PCT/US2015/044690; International Preliminary Report on Patentability dated Feb. 23, 2017; 9 pages.
International Application No. PCT/US2015/044690; International Search Report and Written Opinion dated Dec. 4, 2015; 12 pages.
International Application No. PCT/US2016/044882; International Search Report and Written Opinion dated Nov. 7, 2016; 11 pages.
International Search Report and Written Opinion prepared by the Korean Intellectual Property Office as International Searching Authority for PCT Intl Patent App. No. PCT/US2014/024050 dated Jun. 27, 2014; 9 pages.
International Search Report and Written Opinion prepared by the Korean Intellectual Property Office as International Searching Authority for PCT Intl Patent App. No. PCT/US2014/066628 dated Mar. 10, 2015; 10 pages.
International Search Report and Written Opinion prepared by the Korean Intellectual Property Office as International Searching Authority for PCT Intl Patent App. No. PCT/US2016/044867 dated Nov. 23, 2016; 13 pages.
International Search Report and Written Opinion prepared by the Korean Intellectual Property Office as International Searching Authority for PCT Intl Patent App. No. PCT/US2016/055293 dated Jan. 11, 2017; 12 pages.
Kang et al, "Optimizing the "One Big Switch" Abstraction in Software-Defined Networks", ACM, CoNEXT'13, Dec. 2013, pp. 13-24; <http://dl.acm.org/citation.cfm?id=2535373&CFIC=968133826&CFTOKEN=57638951>.
Publication Notice of PCT Intl Patent App. No. PCT/US2014/024050 dated Sep. 25, 2014; 1 page.
Stuart Clayman et al. 'The Dynamic Placement of Virtual Network Functions.' In: 2014 IEEE Network Operations and Management Symposium (NOMS), May 5-9, 2014, pp. 1-9.
Vilalta et al., "Network Virtualization Controller for Abstraction and Control of Open-Flow-enabled Multi-tenant Multi-technology Transport Networks", IEEE, Jun. 2015, pp. 1-3; <http://ieeexplore.ieee.org/stamp/stamp.jsp?arnumber=7121738>.
Wikipedia (Oct. 2014), "Network Functions Virtualization" http://en.wikipedia.org/wiki/Network_Functions_virtualization; accessed on Oct. 23, 2014; 5 pages.
Yu et al., "What SDN will Bring for Transport Networks?", Open Networking Summit 2014, Mar. 2014, pp. 1-2; <https://www.usenix.org/sites/default/files/ons2014-poster-yu.pdf>.
"On the Implementation of NFV over an OpenFlow Infrastructure: Routing Function Virtualization"; Nov. 11, 2013; 3 pages.
"The 2013 Guide to Network Virtualization and SDN"; https://www.avaya.com/en/documents/the_2013_guide_to-network_virtualization_and_sdn.pdf; Dec. 2013; 6 pages.
European Invitation to Rule 62a(1) EPC, dated Mar. 1, 2018, 3 pages.
European Examination Report, dated Mar. 15, 2018, 6 pages.
International Preliminary Report on Patentability, dated Apr. 10, 2018, 9 pages.

* cited by examiner

PHYSICAL TO VIRTUAL NETWORK TRANSPORT FUNCTION ABSTRACTION

CROSS-REFERENCES TO RELATED APPLICATIONS

This application is a continuation application of U.S. patent application Ser. No. 14/531,000, filed Nov. 3, 2014 by Michael K. Bugenhagen, entitled, "Physical to Virtual Network Transport Function Abstraction," which claims priority to U.S. Patent Application Ser. No. 61/907,330 (the "'330 application"), filed Nov. 21, 2013 by Michael K. Bugenhagen, entitled, "Physical to Virtual Network Transport Function Abstraction."

This application may be related to U.S. patent application Ser. No. 14/061,147 (the "'147 application"), filed Oct. 23, 2013 by Michael K. Bugenhagen, entitled, "Virtualization Congestion Control Framework," which is a continuation-in-part application of U.S. patent application Ser. No. 14/060,450 (the "'450 application"), filed Oct. 22, 2013 by Michael K. Bugenhagen, entitled, "Virtualization Congestion Control Framework," which claims benefit of priority to provisional U.S. Patent Application Ser. No. 61/788,256 (the "'256 application"), filed Mar. 15, 2013 by Michael K. Bugenhagen, entitled, "Virtualization Congestion Control Framework." This application may also be related to U.S. patent application Ser. No. 14/460,085 (the "'085 application"), filed Aug. 14, 2014 by Michael K. Bugenhagen, entitled, "Ethernet Carrier Group Alarm (CGA)," which claims benefit of priority to provisional U.S. Patent Application Ser. No. 61/865,865 (the "'865 application"), filed Aug. 14, 2013 by Michael K. Bugenhagen, entitled, "Ethernet Carrier Group Alarm (CGA)."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing physical to virtual network transport function abstraction.

BACKGROUND

Virtualizing a network function that exists on dedicated equipment removes the ability of the application owner to write code that reads information from the physical ports. In essence, those physical ports, including, without limitation, network cards, have memory and processors that contain state machines, and counters that track state information on the port itself. Once those physical ports become "virtual" ports on virtual machines, those same memory items are not readily available because those are typically hidden to provide the virtual machine ("VM") platform flexibility in changing out Network cards without the application knowing about the changes.

This breaks the normal implementation model, requiring that we move to a new model whereby the Hypervisor (e.g., a host computer operating system) that is providing the application with a "virtual Network Interface Card ("NIC")" be provided with abstracted virtual states for the same application management roles.

Hence, there is a need for more robust and scalable physical to virtual network transport function abstraction solutions.

BRIEF SUMMARY

Various embodiments provide techniques for implementing physical to virtual network transport function abstraction.

In a physical implementation, a software application might have direct access to the Network Interface Card Counters that track all aspects of use and flow. These are sometimes described as atomic counters on the physical card. Only the software application can change what channels and/or ports are being used to fix a broken link.

In a Virtual environment, the hypervisor can swap out virtual equipment and fix the problem for the application, without the application's involvement. However, in doing so, the hypervisor has now added a "suspend"-like state where the port or channel is unavailable for a few seconds, so the hypervisor needs to inform the software application, and possibly delay or block the loss and/or failure signal to the software application.

In the new Virtualized environment, some signals will still pass directly from the virtual interface and/or port driver on the host to the software application via the operating system that the application is riding on. However, many of those signals will be required to travel from the Host to the Virtualization Infrastructure Management function where the decision to send a "suspend" signal to the software application and/or a "block" the failure all together signal are made. This way, the virtual host infrastructure or virtualization infrastructure manager can choose to fix the problem without informing the software application, to inform the software application to wait until the problem is fixed by the hypervisor and virtualization infrastructure manager, or to simply pass the failure through to the software application.

In various embodiments, an orchestrator might be provided within a virtual machine environment context in order to provide two-way communications between the virtual machine ("VM") and one or more applications running in the VM environment in order to communicate host states of hardware resource usage. In some cases, the two-way communications might be established using an application programming interface ("API"). In some embodiments, the two-way communications might include communications from the VM to the one or more applications including available hardware resources, current hardware resources, alarm indication signal ("AIS") notifications, loss of signal ("LOS") notifications, and/or carrier group alarm ("CGA") notifications, and might further include communications from the one or more software applications and/or operating systems to the VM including utilization notifications. Ethernet CGA is described in detail in the '085 and '865 applications (which have already been incorporated herein by reference in their entirety).

Software applications running in a VM may utilize connection state information. According to some embodiments, the hypervisor and/or an orchestrator might continually monitor communications between the software application and the Host or VM to ensure that the software application continues to receive connectivity, and monitor the state information that may be necessary for the software applications to continue executing normally. If the hypervisor or the orchestrator determines that the software application connectivity has failed or is failing via the state information, the hypervisor or the orchestrator might notify a virtual infrastructure manager, or host directly. In some cases, the virtual infrastructure manager or host might determine a course of action, which might include, without limitation, one of fixing the problem (or causing other system elements to fix the problem) without notification the software application of the existence of the problem, or informing the software application to wait (or "suspend" operation) until the problem is fixed by the hypervisor and/or the virtual infrastructure manager, or passing the failure through to the software application.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In one aspect, a method might comprise sending, with a virtual machine ("VM") manager, first information to a virtual infrastructure manager ("VIM"), sending, with the VIM, second information to one of a virtualized application manager or an orchestrator, and sending, with the one of the virtualized application manager or the orchestrator, third information to a virtualized application running in a virtual machine or container.

In some embodiments, at least one of the first, second, or third information might comprise state information. In some cases, the state information might comprise state change information. In some instances, the state information might comprise connection state information. According to some embodiments, at least one of the first, second, or third information might comprise one or more of alarm indication signal ("AIS") notifications, loss of signal ("LOS") notifications, carrier group alarm ("CGA") notifications, jabber, fragmented frames, switch monitoring ("SMON") counters, remote network monitoring ("RMON") counters, flow level statistics, maintenance entity information, functionality information, ping information, trace router information, loopback information, information on test frames, information on connectivity, information on synthetic frames, and/or label-switched path ("LSP") tunnel status information. The flow level statistics, in some cases, might comprise statistics related to one or more of utilization, discarded frames, and/or capacity.

In another aspect, a method might comprise sending, with a virtual network interface card, information to a virtualized application running in a virtual machine or container.

According to some embodiments, the information might comprise state information. In some cases, the state information might comprise virtual driver information. In some instances, the state information might comprise connection state information. In some embodiments, the information might comprise one or more of alarm indication signal ("AIS") notifications, loss of signal ("LOS") notifications, carrier group alarm ("CGA") notifications, jabber, fragmented frames, switch monitoring ("SMON") counters, remote network monitoring ("RMON") counters, flow level statistics, maintenance entity information, functionality information, ping information, trace router information, loopback information, information on test frames, information on connectivity, information on synthetic frames, and/or label-switched path ("LSP") tunnel status information. In some instances, the flow level statistics might comprise statistics related to one or more of utilization, discarded frames, and/or capacity.

In yet another aspect, a system might comprise a first host computing system, a second host computing system, and a third host computing system. The first host computing system might comprise one or more first processors, one or more first hardware components, and a first non-transitory computer readable medium having encoded thereon a first set of instructions that, when executed by the one or more first processors, causes the first host computing system to perform one or more operations. The first set of instructions might comprise instructions to run a virtual machine ("VM"), instructions to run a virtualized application on the VM, and instructions to run a VM manager to manage the VM. The first set of instructions might further comprise instructions for the VM to send first information to a virtual infrastructure manager ("VIM").

The second host computing system might comprise one or more second processors, one or more second hardware components, and a second non-transitory computer readable medium having encoded thereon a second set of instructions that, when executed by the one or more second processors, causes the second host computing system to perform one or more operations. The second set of instructions might comprise instructions to run the VIM, and instructions for the VIM to send second information to one of a virtualized application manager or an orchestrator.

The third host computing system might comprise one or more third processors, one or more third hardware components, and a third non-transitory computer readable medium having encoded thereon a third set of instructions that, when executed by the one or more third processors, causes the third host computing system to perform one or more operations. The third set of instructions might comprise instructions to run the one of the virtualized application manager or the orchestrator, and instructions for the one of the virtualized application manager or the orchestrator to send third information a virtualized application running in a virtual machine or container.

In still another aspect, a system might comprise a host computing system. The host computing system might comprise one or more processors, one or more hardware components, and a non-transitory computer readable medium having encoded thereon a set of instructions that, when executed by the one or more processors, causes the one or more hardware components to perform one or more operations. The set of instructions might comprise instructions to run a virtual machine ("VM"), instructions to run a virtualized application on the VM, and instructions to run a virtual network interface card ("NIC"). The set of instructions might further comprise instructions for the virtual NIC to send information to a virtualized application running in a virtual machine or container.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
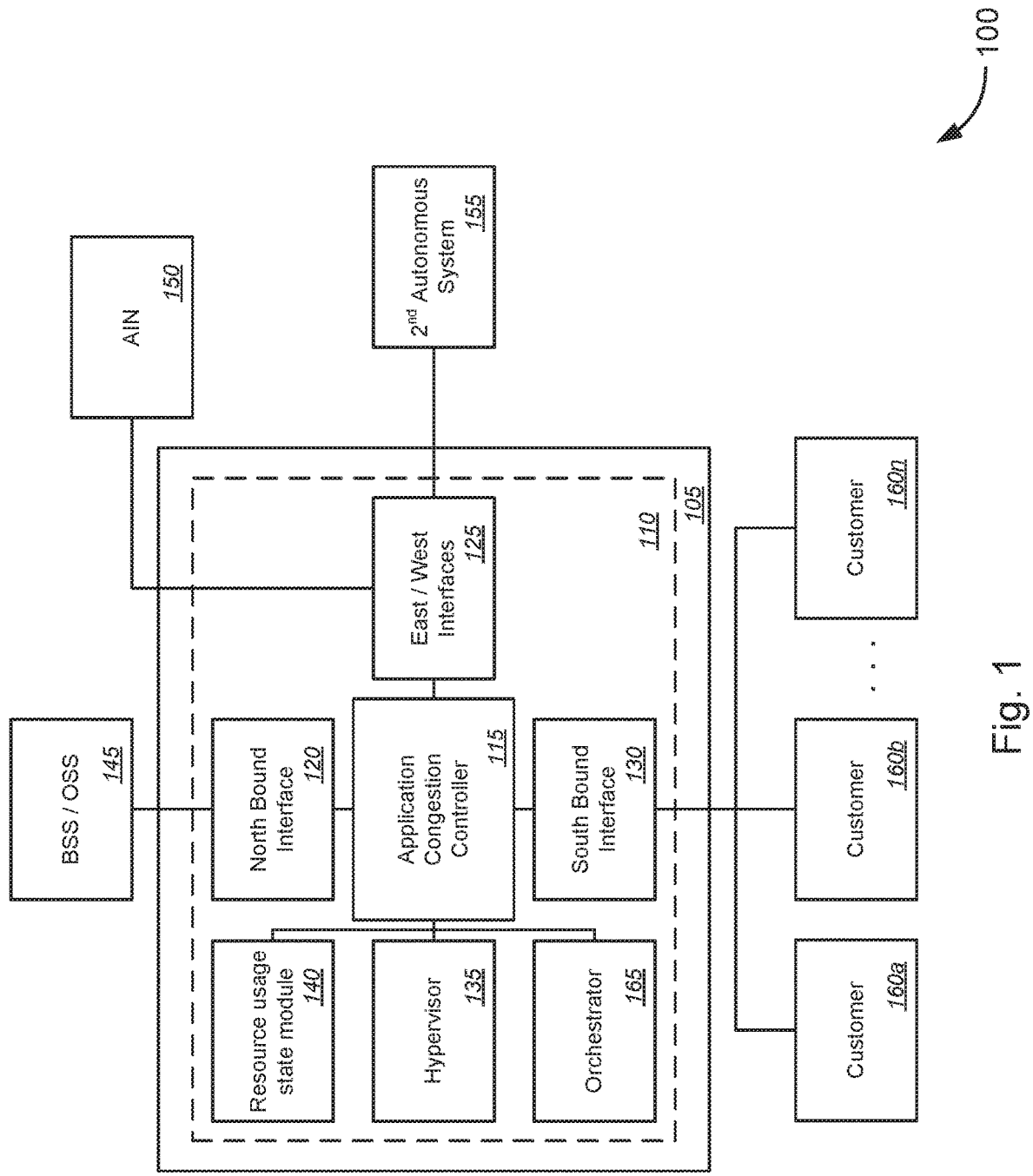
FIG. 1 is a block diagram illustrating a system for controlling virtualization congestion and for implementing physical to virtual network transport function abstraction, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for implementing physical to virtual network transport function abstraction.

Herein, a "hypervisor" might refer to a virtual machine manager ("VMM"), which might be a component of computer software, firmware, and/or hardware that creates and runs virtual machines. The "hypervisor" might run one or more VMs on a computer defined as a "host machine," and each of the one or more VMs might be defined as a "guest machine." In operation, the "hypervisor" might provide the "guest machines" or operating systems of the "guest machines" with a virtual operating platform, and might manage the execution of the "guest machine" operating systems.

The term "business support system" ("BSS") might refer to components that a service provider (such as a telephone operator or telecommunications company) might use to run its business operations, including, for example, taking orders, handling payment issues, or dealing with revenues, and the like. BSS might generally cover the four main areas of product management, customer management, revenue management, and order management. In a related manner, the term "operations support system" ("OSS") might refer to components used by telecommunications service providers to deal with the telecommunications network itself, supporting processes including, but not limited to, maintaining network inventory, provisioning services, configuring network components, managing faults, and the like. The two systems functioning together might be referred to as "BSS/OSS."

An "advanced intelligent network" ("AIN") might refer to any telephone network that queries a database before a telephone call is sent to its final destination in order to determine how to handle or route the call. A typical AIN might provide the following two main functionalities: (1) the AIN might be able to affect or change the routing of calls within it from moment to moment, based on some criteria; and (2) the AIN might allow the originator or the ultimate receiver of the call to somehow inject intelligence into the network to affect the flow of the outbound or inbound call. Typically, AINs might comprise signal control points ("SCPs"), signal switching points ("SSPs"), and signal transfer points ("STPs"), all of which might communicate via out-of-band signaling, using, for example, signaling system 7 ("SS7") protocol. SCPs are typically computers that hold databases in which customer-specific information used by the network for routing calls might be stored. SSPs are typically digital telephone switches that communicate with SCPs to request for customer-specific instructions pertaining to call completion. STPs are typically packet switches that shuttle messages between SSPs and SCPs.

An "application programming interface" ("API") might refer to a protocol intended to be used as an interface by software components to communicate with each other.

Figure 2:
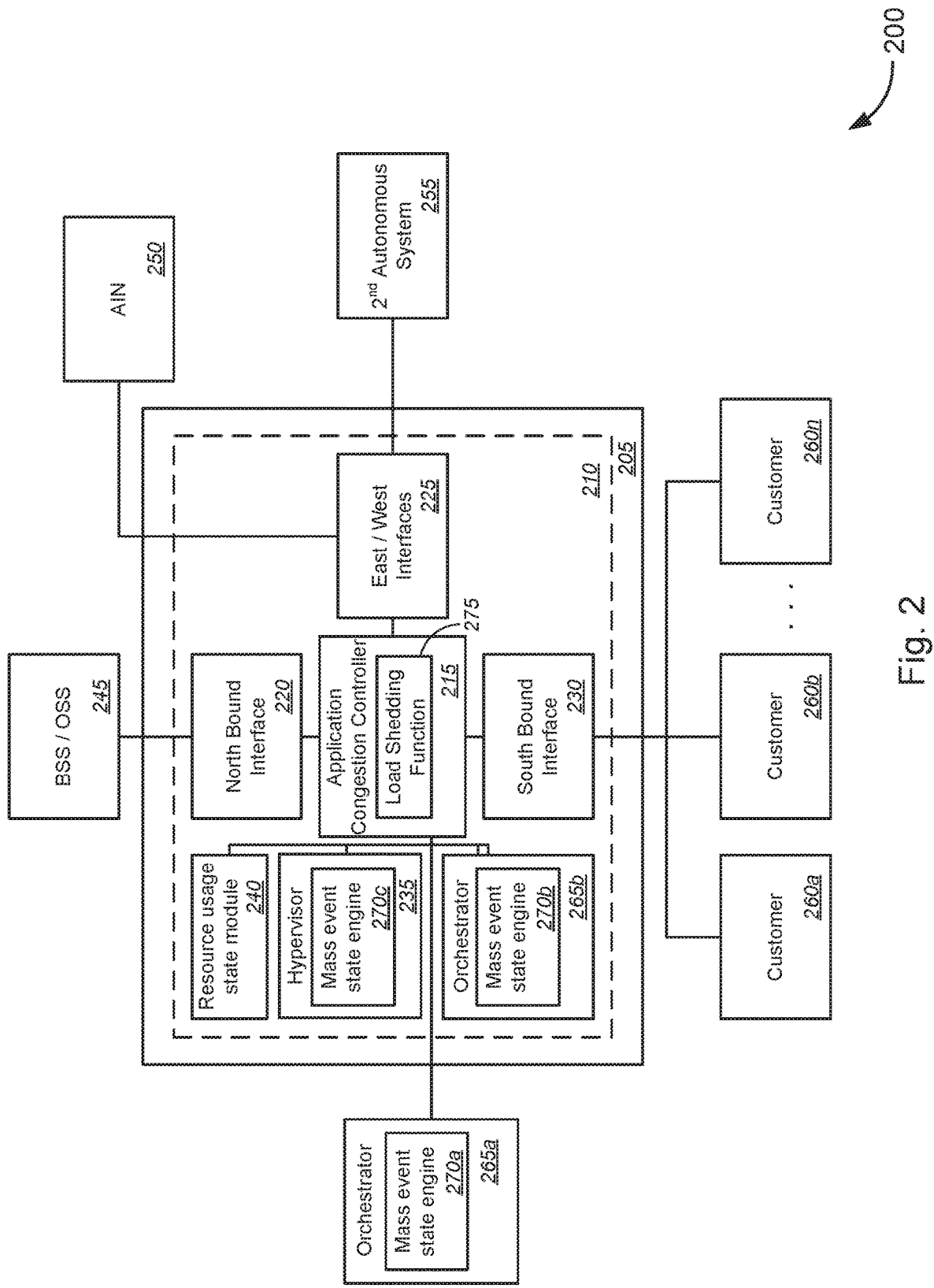
FIG. 2 is a block diagram illustrating an exemplary system for controlling virtualization congestion and for implementing physical to virtual network transport function abstraction, in accordance with various embodiments.

"Virtualization" might refer to a process of mapping hardware resources to create "virtual machine resource" within the framework of the VMs so that the VM environment may utilize the hardware resources. For example, each of the north, south, east, and west interfaces shown in FIGS. 1 and 2 are parts of physical and/or virtual links that have been apportioned or "virtualized" to an application as a port to the application, which might be associated with various external components (i.e., BSS/OSS, AIN, second autonomous systems, customers, and the like) via the hardware or host system on which the VM is running. FIGS. 1 and 2 refer to a virtualization congestion control frameworks as described in detail in the '147 and '450 applications (already incorporated herein), one or more infrastructure components of which may, in some non-limiting embodiment, be utilized in implementing physical to virtual network transport function abstraction, as discussed herein.

We now turn to the embodiments as illustrated by the drawings. FIGS. 1-7 illustrate some of the features of the method, system, and apparatus for implementing physical to virtual network transport function abstraction, as referred to above. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

As discussed above, FIGS. 1 and 2 are block diagrams illustrating systems for controlling virtualization congestion, as described in detail in the '147 and '450 applications (already incorporated herein).

In system 100, as shown in FIG. 1, computer or hardware system 105 might serve as a host machine or host system that creates and operates a virtual environment (or virtual machine environment) 110, in which an application congestion controller 115 (also referred to herein as an "application controller" or a "congestion engine") might run. The application congestion controller 115 might be operatively coupled to a number of interfaces or components, including, but not limited to, a north or north bound interface 120, east/west interfaces 125, south or south bound interface 130, a hypervisor 135, a resource usage state module 140, and an orchestrator 165, all of which might be executed within the virtual environment 110.

System 100 might further comprise a BSS/OSS 145, an AIN 150, one or more second autonomous systems 155, and one or more customers 160. In some embodiments, second autonomous systems 155 might include a computer or hardware system that might be similar to, identical to, or different from computer or hardware system 105. The one or more customers 160 might include customers 160a, 160b, through 160n. Each of customers 160a, 160b, through 160n might comprise a customer device including, but not limited to, POTS telephones, voice over Internet protocol ("VoIP") telephones, cellular telephones, smart phones, tablet computers, laptop computers, desktop computers, or the like.

Computer or hardware system 105 and the second autonomous systems 155 might be located in another service provider network, or might be physically different systems not inside the VM environment but still in the service provider facilities or premises, and might be associated with one or more of VoIP switches, Internet protocol television ("IPTV") servers, content delivery networks ("CDNs"), Internet servers, other network servers, and the like. In some cases, the computer or hardware system 105 and/or the second autonomous systems 155 might comprise one or more of VoIP servers or switches, IPTV servers, content servers (in a CDN), Internet servers, SS7 nodes, and/or other AIN elements, other network servers, and the like. In a particular aspect, such servers can be implemented as applications within a VM or multiple separate VMs on the hardware system 105 and/or the second autonomous systems 155.

As an example, a first customer (e.g., customer 160a) might communicate with a second customer (e.g., customer 160b) via telephone through AIN 150 via a first application (e.g., a VoIP server or switch) running on a first VM within the virtual environment 110 running on the computer or hardware system 105, via the south bound interface 130 and the east/west interface 125. Meanwhile, a third customer (e.g., customer 160n) might be streaming a high-definition ("HD") movie via an IPTV server associated with one of the one or more second autonomous systems 155 via a second application running on a second VM within the virtual environment 110, via the south bound interface 130 and the east/west interface 125. At the same time, the BSS/OSS 145 might be providing business and/or operational support to one or more customers and customer connections via a third application running on a third VM within the virtual environment 110, via the north bound interface 120 and the south bound interface 130. In some aspects, the first, second, and third VMs might be the same VM, or any two of the first, second, or third VMs might be the same VM. In other aspects, the first, second, and third VMs are separate VMs.

With reference to FIG. 2, system 200 might comprise computer or hardware system 205. Computer or hardware system 205, in some embodiments, might serve as a host machine or host system that creates and operates a virtual environment (or virtual machine environment) 210, in which an application congestion controller 215 might run. The application congestion controller 215 (also referred to herein as an "application controller" or a "congestion engine") might be operatively coupled to a number of interfaces or components, including, but not limited to, a north or north bound interface 220, east/west interfaces 225, south or south bound interface 230, a hypervisor 235, and a resource usage state module 240, all of which might be executed within the virtual environment 210.

System 200 might further comprise a BSS/OSS 245, an AIN 250, one or more second autonomous systems 255, and one or more customers 260. In some embodiments, second autonomous systems 255 might include a computer or hardware system that might be similar to, identical to, or different from computer or hardware system 205. The one or more customers 260 might include customers 260a, 260b, through 260n. Each of customers 260a, 260b, through 260n might comprise a customer device including, but not limited to, POTS telephones, voice over Internet protocol ("VoIP") telephones, cellular telephones, smart phones, tablet computers, laptop computers, desktop computers, or the like.

Computer or hardware system 205 and the second autonomous systems 255 might be located at service provider facilities or premises, and might be associated with one or more of VoIP switches, IPTV servers, content servers (e.g., in a CDN), Internet servers, other network servers, and the like. In some cases, the computer or hardware system 205 and/or the second autonomous systems 255 might comprise one or more of VoIP switches/servers, IPTV servers, content servers, Internet servers, other network servers, and the like (each of which could be running as an application on a VM within the virtual environment 210). In a particular aspect, such servers can be implemented as applications within a VM or multiple separate VMs on the hardware system 205 and/or the second autonomous systems 255.

According to some embodiments, computer or hardware system 205, virtual environment (or virtual machine environment) 210, application congestion controller 215, north bound interface 220, east/west interfaces 225, south bound interface 230, hypervisor 235, resource usage state module 240, BSS/OSS 245, AIN 250, the one or more second autonomous systems 255, and the one or more customers 260 might be the same or similar in terms of structure, functionality, or the like as the corresponding components in FIG. 1.

Turning back to FIG. 2, system 200 might further comprise orchestrator 265, which might include an orchestrator 265*a* external to the computer or hardware system 205, an orchestrator 265*b* running on the virtual environment 210 on the computer or hardware system 205, or both. Each orchestrator might comprise a mass event state engine 270 (i.e., orchestrator 265*a* might comprise mass event state engine 270*a*, while orchestrator 265*b* might comprise mass event state engine 270*b*, as shown in FIG. 2). Each mass event state engine 270 might be configured to monitor for mass events and/or mass congestion indicators.

Unlike a conventional hypervisor, the orchestrator 265 might coordinate with the resource usage state module 240 (i.e., by communicating with it) to identify the maximum hardware resources of the host system 205, as well as the currently used hardware resources and the currently available resources. Based on such identifications or determinations, the orchestrator 265 might regulate, rather than simply allocate, hardware resources (e.g., CPU memory storage resources, and the like) that might be used by the applications running on the one or more VMs in the virtual environment 210. In other words, the orchestrator 265 might establish bounds for resources allocated to each application based on these determinations, and perhaps based on priority or importance of each application. For example, government and/or emergency service applications (including, but not limited to, Government Emergency Telecommunications Service ("GETS"), or the like) might be given top priority and provided with all the available hardware resources in lieu of other lower priority applications. In some cases, the orchestrator 265 might push back on the excessive hardware resource usage by the one or more applications. According to some embodiments, the orchestrator 265 might provide the one or more applications with a mechanism for controlling push back (see, for example, the buffer utilization feedback discussed in the '147 and '450 applications).

Systems 100 and/or 200 (or at least one or more infrastructure elements of these systems) may, in some embodiments, be utilized in implementing physical to virtual network transport function abstraction, as described in detail below with respect to FIGS. 4-6.

Figure 3:
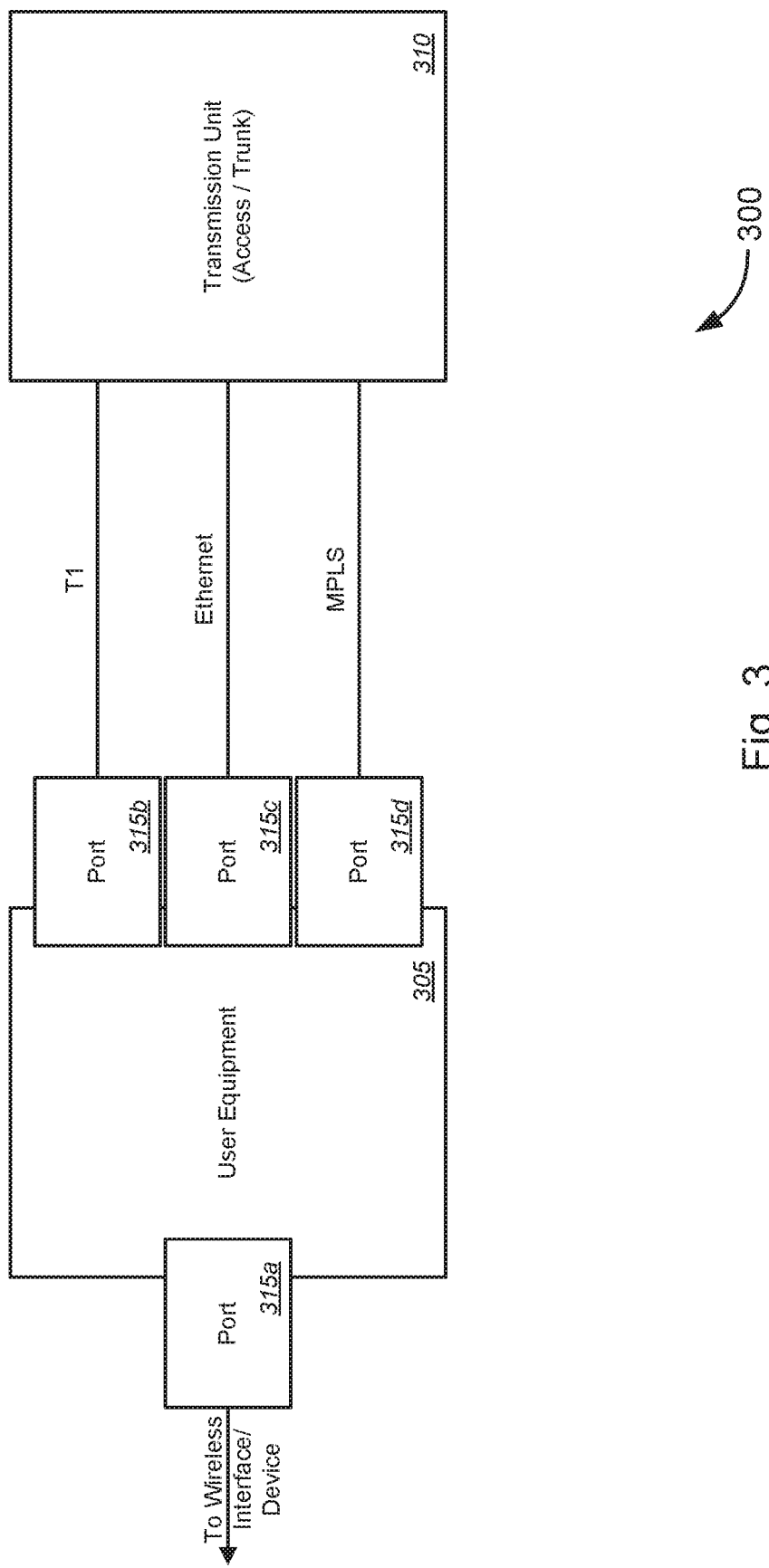
FIG. 3 is a schematic diagram illustrating a system utilizing physical ports for a physical device on which applications are run, in accordance with various embodiments.

FIG. 3 is a schematic diagram illustrating a system 300 utilizing physical ports for a physical device on which applications are run, in accordance with various embodiments. As shown in FIG. 3, system 300 comprises a user equipment, which might include, but is not limited to any suitable end equipment, port bay on switch, application processor/server, and/or user device. The user device might include, without limitation, a laptop computer, a desktop computer, a tablet computer, a smart phone, a mobile phone, and/or the like. System 300 might further comprise a transmission unit 310, which might have access to a network (including, without limitation, an Internet service provider ("ISP") network, data network, a local area network ("LAN"), a wide area network ("WAN"), and/or other suitable network). In some cases, the transmission unit 310 might have access to a trunk of the network.

System 300 might further comprise a plurality of physical ports 315, including ports 315*a*-315*d*. In some embodiments, port 315*a* might provide communication between the user equipment 305 and a wireless device and/or an interface device (not shown). In some cases, port 315*a* might provide information to one or more software applications running on the user equipment 305 indicating port availability. In some instances, each of ports 315*a*-315*d* might provide information indicating port availability. Also universal to all ports are indications regarding port states, such as powered up, powered down, suspend, wake on LAN, wake on WAN, Internet protocol ("IP") stack availability, and/or the like. Access side special functions might include presence awareness. In some cases, the access side special functions might include information regarding whether an address resolution protocol ("ARP") table(s) is(are) registered, whether a media access control ("MAC") address table(s) is(are) registered, whether a machine to machine ("M2M") state engine(s) is(are) registered, and/or the like.

Port 315*b* might provide a T1 line to the transmission unit 310. In some cases, the T1 line might provide multiple indication signals to one or more software applications running on the user equipment 305. The indication signals might include state information (e.g., connection state information, state change information, virtual driver information, and/or the like) required by at least one of the one or more software applications for continued execution on the user equipment 305. The indication signals might include, without limitation, alarm indication signal ("AIS"), loss of signal ("LOS") notification, carrier group alarm ("CGA") signals, and/or the like. The CGA signals might include yellow, red, and/or blue signals, which are described in detail in the '085 application (which has already been incorporated herein by reference in its entirety). In some embodiments, the yellow (or first) signal (or alarm) might indicate, as a status of the network connection, a receive path error from the network perspective of the one or more customer equipment. The red (or second) signal (or alarm) might indicate, as a status of the network connection, a transmit path error from the network perspective of the one or more customer equipment. The blue (or third) signal (or alarm) might indicate, as a status of the network connection, a performance issue error.

Port 315*c* might provide an Ethernet line to the transmission unit 310. In some instances, the Ethernet line might provide port indications and/or operations, administration and maintenance/management ("OA&M" or "OAM") level indicators. OAM includes the processes, activities, tools, and/or standards involved with operating, administering, managing, and/or maintaining any system. In a particular example, Ethernet operations, administration, and maintenance ("EOAM") is the protocol for installing, monitoring, and/or troubleshooting Ethernet metropolitan area network ("MANs") and Ethernet wide area network ("WANs"). Establishing end-to-end OAM is a key part of delivering high-performance, carrier-grade Ethernet services. In some embodiments, for a single port, the port indicators and/or OAM level indicators might include, without limitation, LOS, jabber, fragmented frames, and/or various counters (including, without limitation, switch monitoring ("SMON") counters and remote network monitoring ("RMON") counters). SMON is described in detail in RFC 2613 (which is incorporated herein by reference in its entirety for all purposes), while RMON (in its various forms) are described in detail in RFC 2819, RFC 4502, RFC 3273, and RFC 3577, all of which are also incorporated herein by reference in their entirety for all purposes. In some cases, the port indicators and/or OAM level indicators might include, flow level statistics (e.g., policy statistics, shaper statistics, etc.), which might include, but are not limited to, statistics related to one or more of utilization, discarded frames, and/or capacity, or the like. The OAM level indicators might, in some cases, include, without limitation, maintenance entity information, functionality information, ping information, trace router information, loopback information, information on test frames, information on connectivity, information on synthetic frames, and/or the like.

Port 315d might provide a multiprotocol label switching ("MPLS") interface to the transmission unit 310. The MPLS interface might provide information to port 315d, including MPLS OAM indicators. In some embodiments, MPLS OAM indicators might include label-switched path ("LSP") tunnel status information. In some cases, the MPLS OAM indicators might include, flow level statistics (e.g., policy statistics, shaper statistics, etc.), which might include, but are not limited to, statistics related to utilization, discarded frames, and/or capacity, or the like. The MPLS OAM indicators might, in some cases, include, without limitation, maintenance entity information, functionality information, ping information, trace router information, loopback information, information on test frames, information on connectivity, information on synthetic frames, and/or the like.

When the physical network is transitioned into a virtual network, functionality provided by the physical ports 315a-315d are no longer available in the VM environments. In fact, a key feature of the virtual environment is to hide (or make transparent) the features, characteristics, and communications with physical components. In this manner, the VM manager is provided with flexibility in changing hardware resources as necessary (e.g., for efficient processing, for scalability, etc.) without information the software applications being run, executed, hosted, or otherwise operating in the VM. FIGS. 4-6 below (and in some embodiments, FIGS. 1 and 2 above) illustrate systems in which physical to virtual network transport function abstraction may be implemented to provide the software applications running in the VM with state information (or similar information) necessary for the software applications to continue running, without the physical ports that would provide such information in a physical system.

Figure 4:
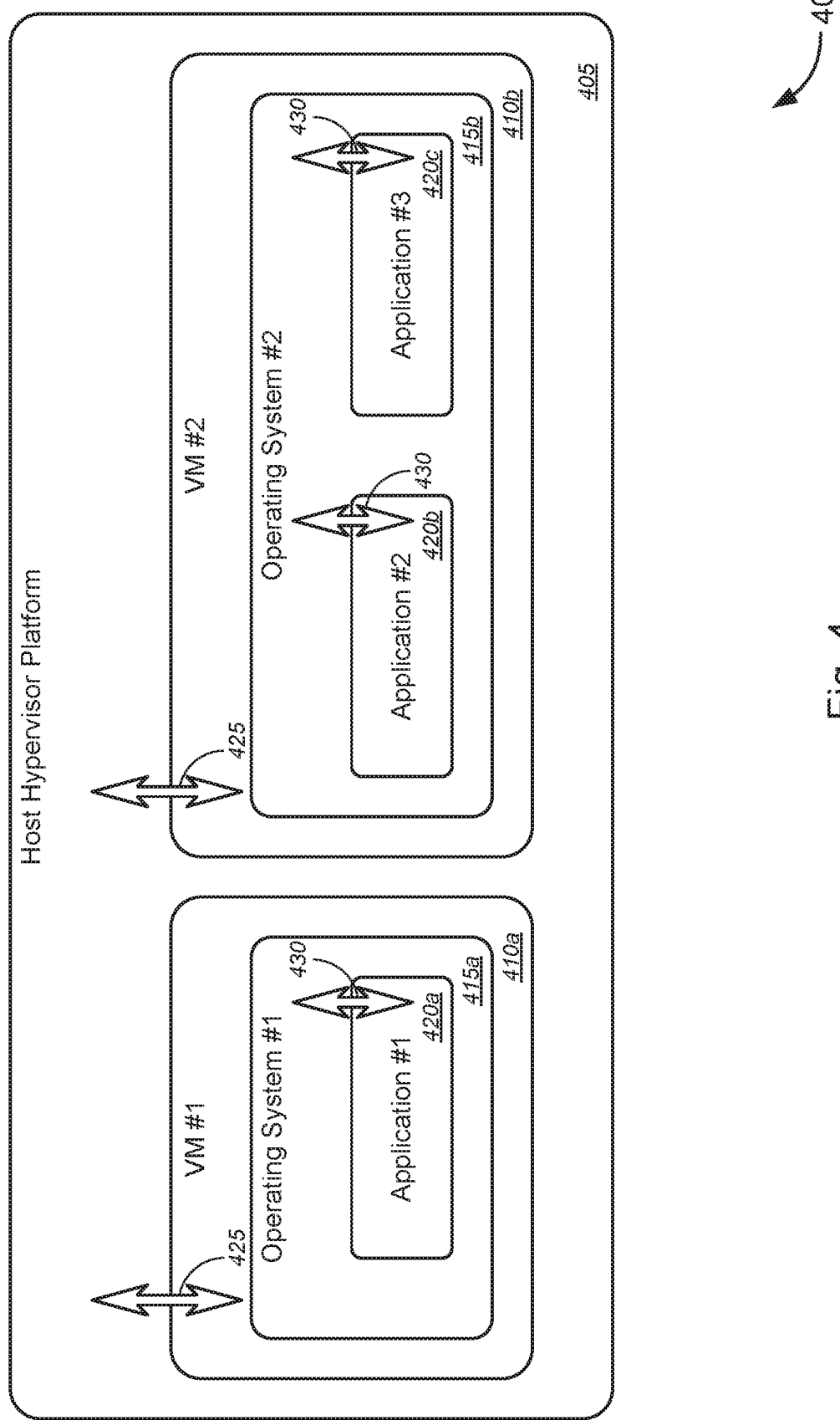
FIG. 4 is a general schematic diagram illustrating a system for implementing physical to virtual network transport function abstraction, in accordance with various embodiments.

In FIG. 4, a general schematic diagram is shown illustrating a system 400 for implementing physical to virtual network transport function abstraction, in accordance with various embodiments. System 400 might comprise a host hypervisor platform 405 on which one or more virtual machine ("VM") environments 410 might operate. VM 410 might comprise a first VM 410a and a second VM 410b, or the like. Running on each VM 410 might be one or more operating systems 415. For example, a first operating system 415a might run on the first VM 410a, while a second operating system 415b might run on the second VM 410b. Each of the operating systems 415 might have running thereon one or more software applications 420.

In the non-limiting example of FIG. 4, a first application 420a might run on the first operating system 415a, while a second application 420b and a third application 420c might each be running on the second operating system 415b. The hypervisor 405 might modify allocation of the application resources (including, but not limited to, memory and/or processor resources, etc.) between the hypervisor 405 and each VM 410, as shown by arrow(s) 425. Alternatively, or in addition, the hypervisor 405 might modify allocation of the application resources (including, but not limited to, memory and/or processor resources, etc.) between each operating system 415 and each software application 420, as shown by arrow(s) 430.

In some cases, the host hypervisor platform 405 or an operating system 415 running within one of the VMs 410 might monitor application resource utilization of the host computer system, and the hypervisor 405 might modify allocation of application resources (e.g., as shown by one or both of arrows 425 and 430), based on a determination that application resource utilization has changed. According to some embodiments, the hypervisor 405 might modify allocation of application resources by increasing allocation of application resources to a first set of the one or more software applications, by decreasing allocation of application resources to a second set of the one or more software applications, or both. Such allocation of resources might, in some instances, be based on a determination that application resource utilization is approaching maximum resource use.

According to some embodiments, the hypervisor might provide information to the software applications 420. The information, in some cases, might include state information, including, without limitation, any, some, or all of the state information provided by any, some, or all of the information provided by physical ports 315a-315d, as discussed above with respect to FIG. 3. In some cases, state information might include connection state information.

Figure 5:
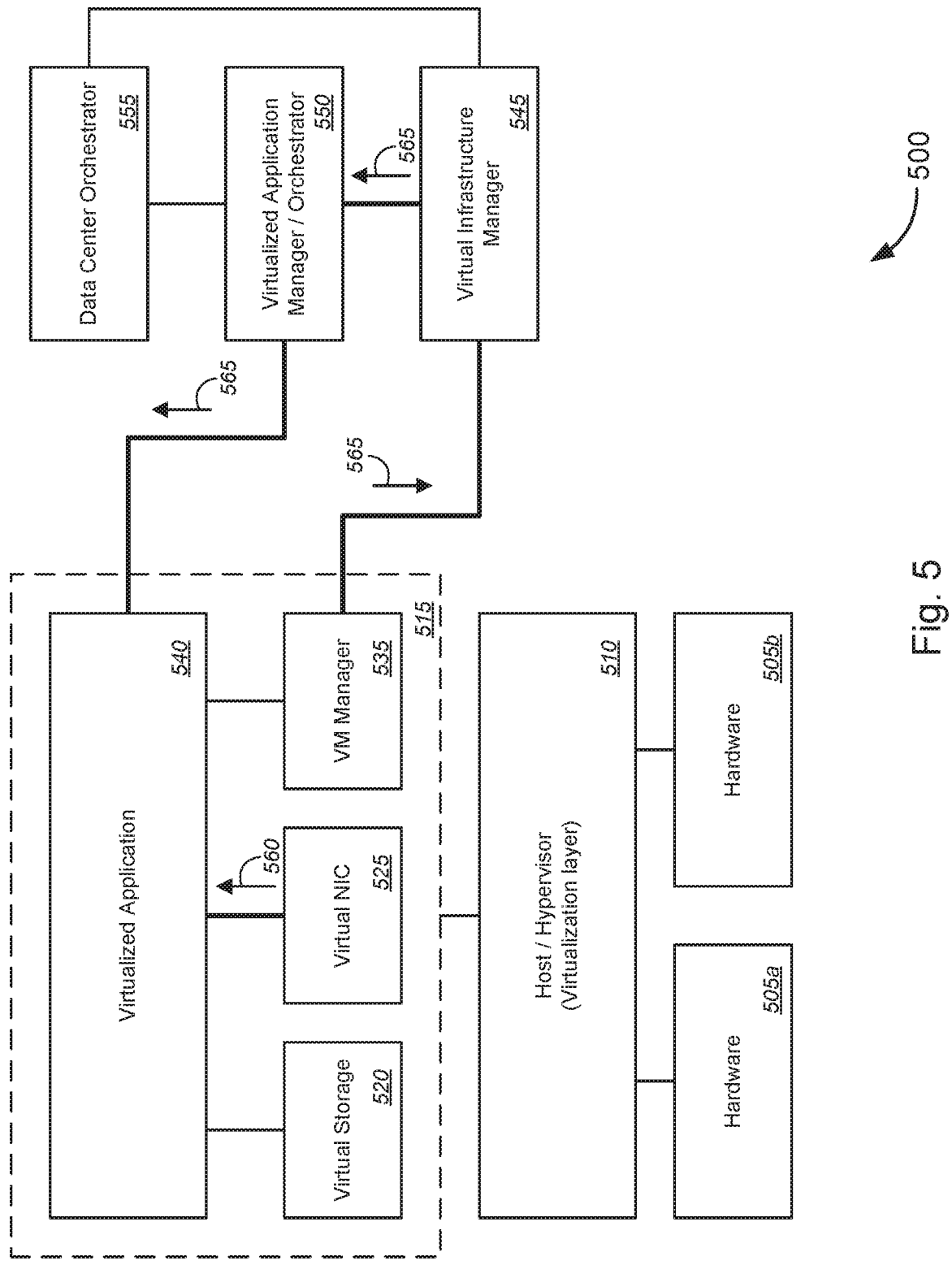
FIG. 5 is a general schematic diagram illustrating another system for implementing physical to virtual network transport function abstraction, in accordance with various embodiments.
Figure 6:
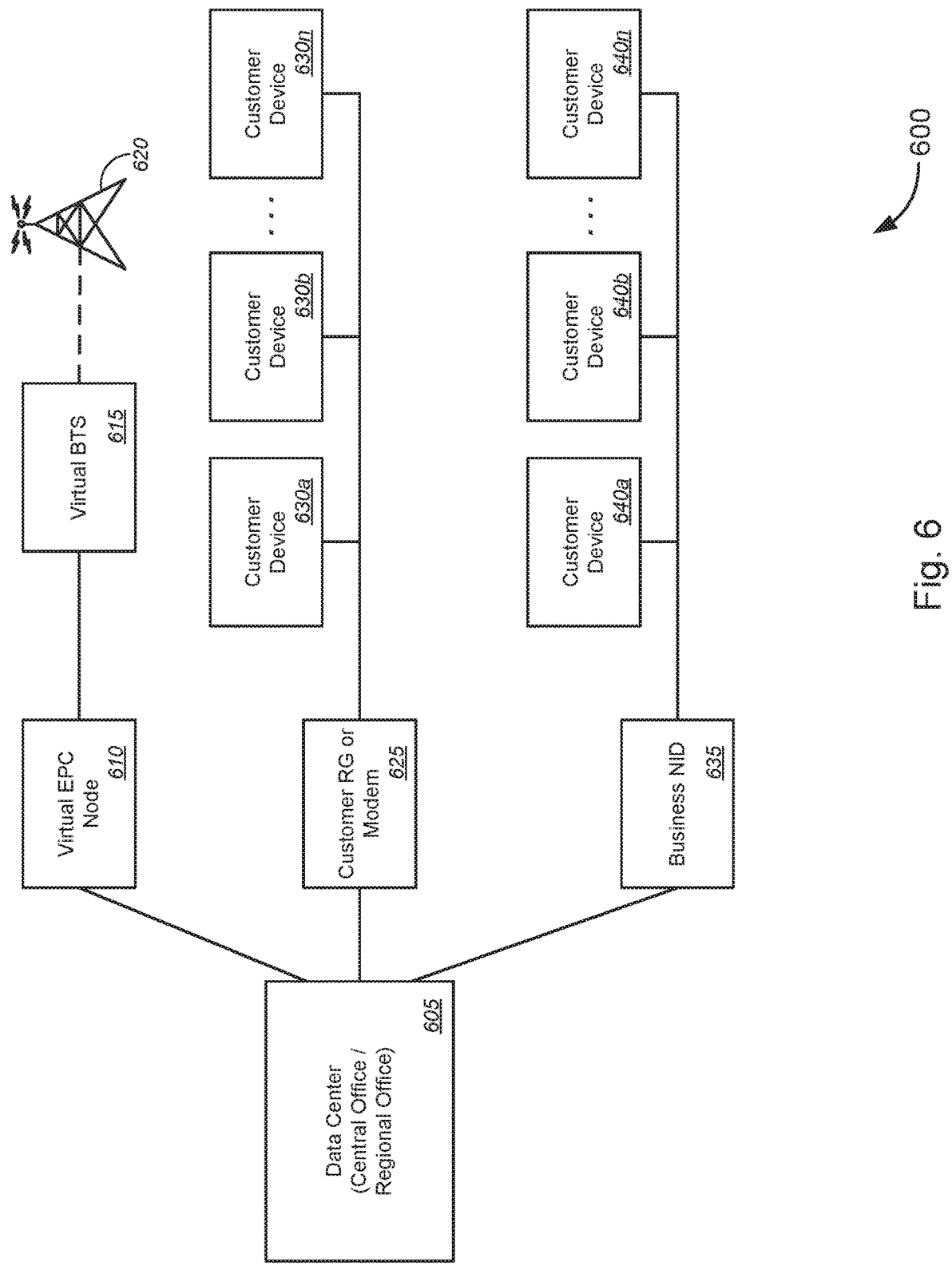
FIG. 6 is a general schematic diagram illustrating a system having connectivity sites where virtualization can occur, in accordance with various embodiments.

We now turn to FIGS. 5 and 6. FIG. 5 is a general schematic diagram illustrating another system 500 for implementing physical to virtual network transport function abstraction, in accordance with various embodiments. FIG. 6 is a general schematic diagram illustrating a system 600 having connectivity sites where virtualization can occur, in accordance with various embodiments.

In a non-limiting example as shown in FIG. 5, system 500 might comprise one or more hardware components 505 (including hardware components 505a and 505b), a host/hypervisor 510 in a virtualization layer, a VM or container 515, a virtual storage 520, a virtual network interface card ("NIC") 525, a VM manager 535, and a virtualized application 540 running within the VM or container 515. In some cases, system 500 might further comprise virtual infrastructure manager ("VIM") 545, virtualized application manager/orchestrator 550, and/or data center orchestrator 555. In some embodiments, host/hypervisor 510 might be communicatively coupled to each of hardware 505a, 505b, and VM or container 515. VM or container 515 might comprise the virtual storage 520, the virtual NIC 525, the VM manager 535, and the virtualized application 540. The virtualized application 540 might have access to data stored in the virtual storage 520 and/or information provided by the virtual NIC 525. The VM manager 535, in some instances, might send control information to the virtualized application 540, or might otherwise control hosting or operation of the virtualized application 540 within VM or container 515.

Possible solutions to the problem of transitioning from the physical port-based infrastructure to a virtual port-based infrastructure might include adding functionality to one or both of the virtual machine host (e.g., host/hypervisor 510) or the virtual infrastructure manager (e.g., VIM 545). In particular, host/hypervisor 510 might be configured to provide drivers in the virtual NICs 525 that support the virtual port functions (or other virtual functions). Alternatively, or in addition, VIM 545 might need to pass some types of signals up to a "cloud application manager" when the signals are received from the host where the VM is running.

With reference to FIG. 5, the virtual NIC 525 might present the (virtual) drivers and/or state information directly to the virtualized application 540 (e.g., as shown by arrow 560). Alternatively, or in addition, the VM monitor and/or manager 535 might track state changes, and might provide the state changes to the VIM 545, which might instruct the virtualized application manager/orchestrator 550 accordingly. The virtualized application manager/orchestrator 550 might, in turn, provide the virtualized application 540 with state change information, state information, (virtual) drivers, and/or the like. The path from VM manager 535, through the VIM 545, through the virtualized application manager 550, and to the virtualized application 540 is shown in FIG. 5, e.g., by arrows 565. Herein, the term "atomic operation" or "atomic" might refer to operations or such that are indivisible, or the like. Atomic information and/or state information that might be added to the virtual drivers might include, without limitation, RMON counters, SMON counters (e.g., virtual LAN ("VLAN") counters), OAM message exchange pattern ("MEP") functions, IP/MPLS OAM functions, Jabber (port level), LOS (port level), collisions (port level), capacity/utilization-derived metrics, service attributes (including bandwidth per class of service instance, etc.), service state (including maintenance, reserved, standby, etc.), connectivity issue (including heartbeat to another element down, etc.), powered up state, powered down state, and/or the like.

Turning to FIG. 6, system 600 might comprise data center 605, virtual evolved packet core ("EPC") node 610, virtual base transceiver station ("BTS") 615, which may or may not be in communication with a physical base transceiver station 620. System 600 might further comprise a customer residential gateway ("RG") or customer modem 625, which might be communicatively coupled (wirelessly and/or in a wired manner) with one or more customer devices 630a-630n (collectively, "customer devices 630"). The customer devices 630 might include, without limitation, a laptop computer, a desktop computer, a tablet computer, a game console, a television, a set top box, a smart phone, a mobile phone, a personal digital assistant ("PDA"), and/or the like. System 600, in some instances, might comprise a business network interface device ("NID"), which might include, without limitation, an optical network terminal ("ONT") or any other suitable type of NID, or the like. The business NID 635 might be communicatively coupled (wirelessly and/or in a wired manner) with one or more customer devices 640a-640n (collectively, "customer devices 640"). The customer devices 640 might include, without limitation, a laptop computer, a desktop computer, a tablet computer, a game console, a television, a set top box, a smart phone, a mobile phone, a personal digital assistant ("PDA"), and/or the like. The data center 605 might, in some instances, include a central office or a regional office. According to some embodiments, the data center 605 might provide various services through the virtual EPC node 610, the customer RG or modem 625, and/or the business NID 635. The various services might include, without limitation, information management services ("IMS"), content delivery network ("CDN") services, video over IP services, platform as a service ("PaaS"), infrastructure as a service ("IaaS"), and/or network as a service ("NaaS"), or the like.

Figure 7:
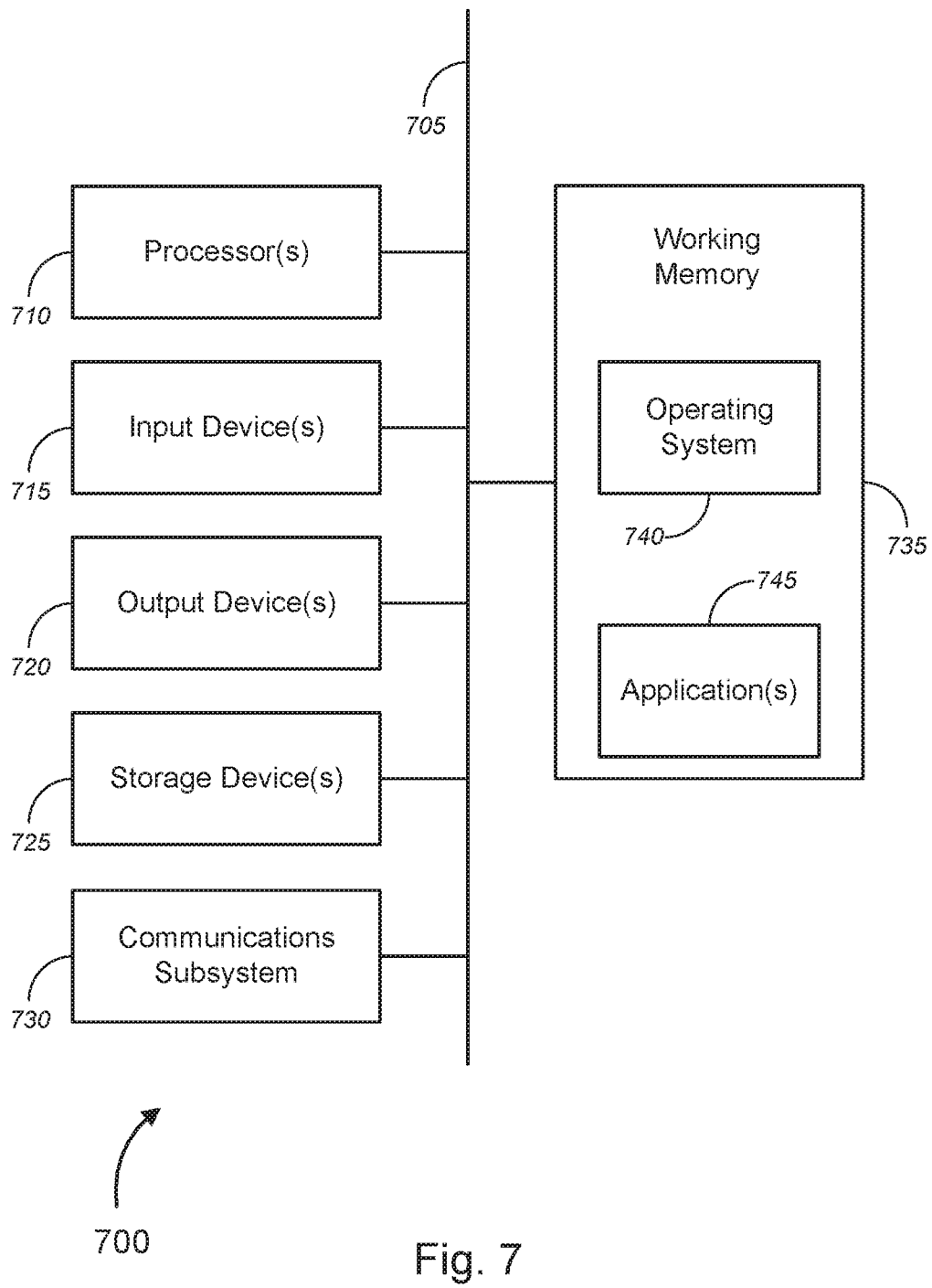
FIG. 7 is a block diagram illustrating an exemplary computer or system hardware architecture, in accordance with various embodiments.

FIG. 7 is a block diagram illustrating an exemplary computer or system hardware architecture, in accordance with various embodiments. FIG. 7 provides a schematic illustration of one embodiment of a computer system 700 of the service provider system hardware that can perform the methods provided by various other embodiments, as described herein, and/or can perform the functions of computer or hardware system (i.e., host system) 105, 205, 405, and/or 510, as described above. It should be noted that FIG. 7 is meant only to provide a generalized illustration of various components, of which one or more (or none) of each may be utilized as appropriate. FIG. 7, therefore, broadly illustrates how individual system elements may be implemented in a relatively separated or relatively more integrated manner.

The computer or hardware system 700—which might represent an embodiment of the computer or hardware system or host system 105, 205, 405, and/or 510 described above with respect to FIGS. 1, 2, 4, and 5—is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, and/or the like); one or more input devices 715, which can include without limitation a mouse, a keyboard and/or the like; and one or more output devices 720, which can include without limitation a display device, a printer, and/or the like.

The computer or hardware system 700 may further include (and/or be in communication with) one or more storage devices 725, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 700 might also include a communications subsystem 730, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 730 may permit data to be exchanged with a network (such as the network described below, to name one example), with other computer or hardware systems, and/or with any other devices described herein. In many embodiments, the computer or hardware system 700 will further comprise a working memory 735, which can include a RAM or ROM device, as described above.

The computer or hardware system 700 also may comprise software elements, shown as being currently located within the working memory 735, including an operating system 740, device drivers, executable libraries, and/or other code, such as one or more application programs 745, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 725 described above. In some cases, the storage medium might be incorporated within a computer system, such as the system 700. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 700 and/or might take the form of source and/or installable code, which, upon compilation and/or installation on the computer or hardware system 700 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 700) to perform methods in accordance with various embodiments of the invention. According to a set of embodiments, some or all of the procedures of such methods are performed by the computer or hardware system 700 in response to processor 710 executing one or more sequences of one or more instructions (which might be incorporated into the operating system 740 and/or other code, such as an application program 745) contained in the working memory 735. Such instructions may be read into the working memory 735 from another computer readable medium, such as one or more of the storage device(s) 725. Merely by way of example, execution of the sequences of instructions contained in the working memory 735 might cause the processor(s) 710 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 700, various computer readable media might be involved in providing instructions/code to processor(s) 710 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 725. Volatile media includes, without limitation, dynamic memory, such as the working memory 735. Transmission media includes, without limitation, coaxial cables, copper wire and fiber optics, including the wires that comprise the bus 705, as well as the various components of the communication subsystem 730 (and/or the media by which the communications subsystem 730 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 700. These signals, which might be in the form of electromagnetic signals, acoustic signals, optical signals, and/or the like, are all examples of carrier waves on which instructions can be encoded, in accordance with various embodiments of the invention.

The communications subsystem 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a storage device 725 either before or after execution by the processor(s) 710.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   sending, with a virtual machine ("VM") manager, first information to a virtual infrastructure manager ("VIM");
   sending, with the VIM, second information to one of a virtualized application manager or an orchestrator; and
   sending, with the one of the virtualized application manager or the orchestrator, third information to a virtualized application running in a virtual machine or container,
   wherein at least one of the first, second, or third information comprises one or more of alarm indication signal ("AIS") notifications, loss of signal ("LOS") notifications, carrier group alarm ("CGA") notifications, jabber, fragmented frames, switch monitoring ("SMON") counters, remote network monitoring ("RMON") counters, maintenance entity information, functionality information, ping information, trace router information, loopback information, information on test frames, information on connectivity, information on synthetic frames, or label-switched path ("LSP") tunnel status information, and
   wherein at least one of the first, second, or third information further comprises flow level statistics, wherein the flow level statistics comprise statistics related to utilization, discarded frames, and capacity.

2. The method of claim 1, wherein at least one of the first, second, or third information further comprises state change information.

3. The method of claim 1, wherein at least one of the first, second, or third information further comprises connection state information.

4. The method of claim 1, further comprising:
   sending, with a virtual network interface card, fifth information to the VM manager, wherein the first information is based at least in part on the fifth information.

5. A system, comprising:
   a first host computing system, said first host computing system comprising one or more first processors, one or more first hardware components, and a first non-transitory computer readable medium having encoded thereon a first set of instructions that, when executed by the one or more first processors, causes the first host computing system to perform one or more operations, the first set of instructions comprising:
   instructions to run a virtual machine ("VM");
   instructions to run a virtualized application on the VM;
   instructions to run a VM manager to manage the VM; and
   instructions for the VM to send first information to a virtual infrastructure manager ("VIM");
   a second host computing system, said second host computing system comprising one or more second processors, one or more second hardware components, and a second non-transitory computer readable medium having encoded thereon a second set of instructions that, when executed by the one or more second processors, causes the second host computing system to perform one or more operations, the second set of instructions comprising:
   instructions to run the VIM; and
   instructions for the VIM to send second information to one of a virtualized application manager or an orchestrator;
   a third host computing system, said third host computing system comprising one or more third processors, one or more third hardware components, and a third non-transitory computer readable medium having encoded thereon a third set of instructions that, when executed by the one or more third processors, causes the third host computing system to perform one or more operations, the third set of instructions comprising:
   instructions to run the one of the virtualized application manager or the orchestrator; and
   instructions for the one of the virtualized application manager or the orchestrator to send third information a virtualized application running in a virtual machine or container,
   wherein at least one of the first, second, or third information comprises one or more of alarm indication signal ("AIS") notifications, loss of signal ("LOS") notifications, carrier group alarm ("CGA") notifications, jabber, fragmented frames, switch monitoring ("SMON") counters, remote network monitoring ("RMON") counters, maintenance entity information, functionality information, ping information, trace router information, loopback information, information on test frames, information on connectivity, information on synthetic frames, or label-switched path ("LSP") tunnel status information,
   wherein at least one of the first, second, or third information further comprises flow level statistics, wherein the flow level statistics comprise statistics related to utilization, discarded frames, and capacity.

6. The system of claim 5, wherein at least one of the first, second, or third information further comprises state change information.

7. The system of claim 5, wherein at least one of the first, second, or third information further comprises connection state information.

8. The system of claim 5, wherein the first information is based at least in part on fifth information sent from a virtual network interface card to VM manager.

9. A system, comprising:
   a host computing system, said host computing system comprising one or more processors, one or more hardware components, and a non-transitory computer readable medium having encoded thereon a set of instructions that, when executed by the one or more processors, causes the one or more hardware components to perform one or more operations, the set of instructions comprising:
   instructions to run a virtual machine ("VM");
   instructions to run a virtualized application on the VM;
   instructions to run a virtual network interface card ("NIC"); and instructions for the virtual NIC to send information to a virtualized application running in a virtual machine or container, wherein the information comprises one or more of alarm indication signal ("AIS") notifications, loss of signal ("LOS") notifications, carrier group alarm ("CGA") notifications, jabber, fragmented frames, switch monitoring ("SMON") counters, remote network monitoring ("RMON") counters, maintenance entity information, functionality information, ping information, trace router information, loopback information, information on test frames, information on connectivity, information on synthetic frames, or label-switched path ("LSP") tunnel status information, wherein at least one of the first, second, or third information further comprises flow level statistics, wherein the flow level statistics comprise statistics related to utilization, discarded frames, and capacity.

10. The system of claim 9, wherein at least one of the first, second, or third information further comprises virtual driver information.

11. The system of claim 9, wherein at least one of the first, second, or third information further comprises connection state information.

* * * * *